3,368,909
METHOD FOR COATING FRUITS

Carl O. Moore, Decatur, and John W. Robinson, Blue Mound, Ill., assignors to A. E. Staley Manufacturing Company, Decatur, Ill., a corporation of Delaware
No Drawing. Filed Feb. 3, 1964, Ser. No. 342,228
4 Claims. (Cl. 99—168)

Our invention relates to protective coatings for fruits. More particularly, our invention relates to edible, non-coherent protective coatings for fruits which have surface deposits of sugar.

It is well known that on storage, fruits which are ordinarily sticky because of the presence of surface deposits of sugar are subject to certain deleterious changes. Such fruits include dates, figs, the dried fruits, for example prunes, apricots and raisins, and candied fruits, such as candied cherries, candied citron, candied citrus peel, etc. When fruits of this type are stored in a moisture atmosphere, they become even more sticky and tend to clump or stick together. When the storage period is unusually long the fruits may become moldy and inedible. To solve these problems, it has been proposed that the fruits be coated with various coatings, such as pectins, waxes and fats. However, none of these coatings have been able to prevent the fruits from sticking together when they are applied in the limited amounts necessary to avoid altering the appearance and flavor of the fruit.

We have now discovered a new and highly advantageous method for coating fruits which possesses none of the drawbacks of previous methods. When coated by our method, fruits which have surface deposits of sugar do not stick or clump together. Furthermore, they retain these desirable characteristics under normal storage conditions. The net result is that the method of the invention leads to products which may be stored for relatively long periods of time without undergoing deleterious changes. This faculty of maintaining the individual pieces of fruit separate and non-coherent is very valuable as containers may be filled by automatic machinery and the consumer may serve portions by spilling out the material from the container. Such action is to be contrasted with the usual tendency of the fruit products to stick together, requiring hand packaging in the factory and separation of desired portions by the consumer by tearing apart individual pieces with the fingers. Furthermore, the coatings in accordance with the invention are essentially odorless and tasteless and thus do not detract from the aroma and taste of the fruit itself. Also, the fruit is furnished with an edible dirt-resistant coating which offers resistance to the action of bacteria, fungi, oxygen, etc.

Generally, our new method for providing fruits with a non-coherent coating comprises contacting the fruit with an aqueous dispersion of amylose and an edible plasticizer for the amylose to form a coating and gelling the coating on the surface of the fruit. The dispersion may be applied to the fruit by dipping, spraying or any other appropriate manner, after which the product may be dried. If desirable, more than one application of the dispersion of the dried fruit may be made with intermediate drying between applications. In our invention the term "non-coherent coating" is taken to mean a coating which will not cause individual pieces of fruit to adhere to other pieces of fruit.

The amount of amylose which can be used in the aqueous dispersions of our process will vary depending, among other things, on the solubility of the amylose, the temperature of the dispersion during the coating operation, the strength and thickness desired from the coating, the particular fruit to be coated, etc. We have found that when more than 30% by weight amylose dry substance is included in the dispersion, the said weight based on the weight of the water, the dispersion tends to become quite viscous and often will gel rapidly even at relatively high temperatures on the order of 100–120° C. Also, we have found that coatings deposited from dispersions of less than 3% by weight amylose are non-uniform and lack strength. Generally, we prefer to use from about 5 to about 25% by weight of amylose, the weight based on the weight of the water in the dispersion.

It is necessary, in order to obtain a coating which is flexible and will not easily flake or peel from the fruit, to include a plasticizer for the amylose in the aqueous coating dispersion. Any edible plasticizer for amylose may be utilized. Examples of such plasticizers include glycerol, lecithin, choline chloride, corn syrup, sorbitol, mannitol, dextrose, 1,2,6-hexanetriol, the acetylated glycerides, for example esters of glycerine containing the acyl radical of both acetic acid and long chain fatty acids containing from 8–22 carbon atoms, and the like.

The weight ratio of edible amylose plasticizer to amylose (dry solids basis) can vary over a wide range, depending for example on the particular plasticizer utilized, the amount of amylose in the dispersion, and the degree of flexibility desired for the coating. Generally we have found that suitable coatings can be prepared using a weight ratio of as low as 5 parts amylose plasticizer for each 95 parts amylose. We have found that the coatings tend to become sticky and do not gel properly when more than 80 parts amylose plasticizer for each 20 parts amylose is utilized. For optimum results we prefer to use a weight ratio of amylose plasticizer to amylose of from 20:80 to 60:40.

For the purpose of this invention, the term "amylose" refers to the amylose resulting from the separation of the amylose and amylopectin components of starch or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high amylose corn starch containing approximately 55% amylose), "Amylon VII" (high amylose corn starch containing up to 70% amylose), etc. We have found that it is preferable in forming our coatings to limit the amylopectin content of the amylose to less than 20% by weight.

The aqueous dispersions utilized in our invention can be prepared by any suitable means. For example, we can dissolve the amylose in water and then add the plasticizer to the amylose solution. We also can combine an amylose solution with a solution of amylose plasticizer. Also, we can dissolve the amylose and the amylose plasticizer in water in one operation. The temperature required to place the amylose in solution will vary depending, among other things, on the water solubility of the amylose utilized. For example, amylose which has been made cold water soluble can be readily dissolved in water having a temperature of 75° F. A typical process for obtaining cold water soluble amylose is described in U.S. Patent 3,086,890 to Sarko et al. Amylose which is not cold water soluble may be conveniently and easily dissolved by heating a suspension of amylose in water under pressure at elevated temperatures, for example in the range of 250–350° F. In order to form a solution of amylose in water under pressure at elevated temperatures, an apparatus of the type disclosed in U.S. Patent 3,101,284 to O. R. Etheridge may be used. In this apparatus steam at superatmospheric pressure is continuously mixed with the water-amylose mixture in the throat of a steam jet. In this way the desired temperature is reached virtually instantaneously and a fluid solution is obtained in a matter of a few seconds. In the apparatus of the Etheridge patent referred to, the steam heated suspension flows downward into and through a detention zone where the hot suspension is maintained at an elevated temperature for a period of time that is selectable, but this is not necessary. This apparatus is so arranged and constructed that there is substantially no mixing in the detention zone in order that the amylose solution withdrawn from the bottom of the detention zone be maintained at a uniform temperature for a uniform length of time.

Other methods may be used in forming amylose solutions. For example, we can employ an autoclave or we can pump a mixture of water and amylose to a heat exchanger which comprises a coil of tubing in a constant temperature environment. If desired, the resulting fluid solution can then be transferred to a detention vessel and maintained at a selectable temperature for a suitable amount of time.

As previously stated, the aqueous dispersion may be applied to the fruit to form a coating by any suitable technique. It is necessary, of course, to maintain the dispersion at a temperature which is sufficient to prevent the amylose dispersion from gelling or becoming excessively viscous before the fruit is coated. Therefore, it is usually most convenient to use the dispersion as soon as possible after its preparation.

As previously stated, one of the advantages of our coatings is that they are edible. Therefore, when the products are consumed directly they may be eaten with the coating intact. If the coated fruit is to be cooked before eating, as by boiling in water, then the coating will normally be removed by the cooking water.

Various other materials may be incorporated in the aqueous amylose dispersion in minor proportions to give the coating certain characteristics as may be desired. For example, we may incorporate dyes or pigments to form colored coatings. Also, mold inhibiting agents may be incorporated to give the coatings greater protective value as regards resistance to spoilage organisms. For example, about 0.1% of ethyl parahydroxybenzoate may be added to the disperson to give the coating mold inhibiting properties. Also, flavoring agents, for example spices, condiments and sweetening agents may be added to the aqueous dispersion to give the coating the desired odor and/or taste.

While our coating method is most advantageously used in coating fruits which carry surface deposits of sugar and are therefore sticky in nature, the invention can also be employed for coating such foods as meat products, for example sausage, ham, smoked fish, smoked fowl, sliced bacon (to prevent the pieces from sticking together); dairy products such as sliced cheese (to prevent the pieces from sticking together); flavorings, spices, vegetables, nuts, cereals, for instance any of the flaked, puffed or otherwise shaped forms of corn, wheat, rice, oats barley, bran, etc.

The following examples illustrate the method of our invention but they are not intended as a limitation of the invention.

The following example demonstrates the effectiveness of our process in coating raisins.

*Example 1*

An aqueous solution of corn amylose was prepared by heating a mixture of 40 grams corn amylose and 360 grams of water to 295° F. in an apparatus of the type described in the Etheridge patent referred to before. The sample was retained at about 295° F. for 30 seconds. The solution was then combined with an aqeuous dispersion prepared by thoroughly mixing 40 grams "Myvacet," a distilled, acetylated monoglyceride manufactured by Eastman Kodak, 2 grams of polyoxyethylene sorbitan monostearate, an emulsifier, with 158 grams of hot tap water. Five pounds of raisins were then placed on a screen. The aqueous dispersion was then sprayed on the raisins to provide them with a coating. The spraying application was conducted using a Nordsen Model HP sprayer manufactured by the Nordsen Corporation of Amherst, Ohio. Briefly, this apparatus consists of a reservoir for the aqueous coating dispersion, a heat exchanger, a spray nozzle equipped with means for opening and closing the spray nozzle, a conduit for conducting the coating dispersion from the reservoir through the heat exchanger to and out through the spray nozzle when the nozzle is open, and for returning the coating dispersion to the reservoir when the spray nozzle is closed, and a means for pumping the coating dispersion from the reservoir through the conduit. After the raisins were coated they were allowed to drain to obtain a gelled coating. The raisins were then dried for 30 minutes in a drying oven at 125° F.

It was observed that the dried raisins were coated with a transparent, glossy, non-coherent, gelled coating. The raisins were then stored in closed jars for one week. At the end of the storage period the raisins poured freely and did not clump or stick together.

The following example is given to show the effectiveness of our process for coating dates.

*Example 2*

An aqueous solution of corn amylose and corn syrup was prepared by heating a mixture of 1.5 lbs. corn amylose, ½ lb. 42 D.E., 43 Baumé corn syrup and 4 lbs. water to 300° F. in an apparatus of the type described in the Etheridge patent referred to before. The sample was maintained at about 300° F. for about 30 seconds. The resulting dispersion was placed in a one gallon insulated thermos jug. Dates were then individually dipped into the dispersion and then placed on waxed paper to gel the coating at room temperature.

It was observed that the dates were coated with a transparent, glossy, non-coherent, gelled coating. The dates had good texture and were not sticky to the touch. The dates were then stored in a closed jar for one week. After the storage period the dates did not clump or stick together.

It is to be understood that the above described embodiments of our invention are for the purpose of illustration only, and our invention is limited only by the claims which follow.

We claim:

1. A method for providing a fruit which has surface deposits of sugar with a protective, edible, non-coherent coating which comprises contacting the fruit with an aqueous medium comprising an aqueous dispersion of amylose and an edible amylose plasticizer to form a coating, the amount of amylose dry substance in the dispersion being from about 3 to about 30% by weight based on the weight of the water in the dispersion, and gelling the coating on the fruit.

2. The method of claim 1 wherein the weight ratio of amylose plasticizer dry substance to amylose dry substance is 5:95 to 80:20.

3. The method of claim 2 wherein the amount of amylose ranges from about 5 to about 20% and the weight ratio of amylose plasticizer to amylose is 20:80 to 60:40.

4. The method of claim 2 wherein the amylose is derived from corn starch.

References Cited

UNITED STATES PATENTS 2,622,033  12/1952  Fusco _____ 99—168

OTHER REFERENCES

Pigman: Carbohydrates, Academic Press, New York, N.Y., 1957, page 678, Jacobs Food Interscience Pub., 1951, vol. III, pp. 1982–1983.

A. LOUIS MONACELL, *Primary Examiner.*

M. VOET, *Assistant Examiner.*